May 15, 1956 W. R. YOUNG, JR 2,745,953

RADIANT ENERGY SIGNALING SYSTEMS

Filed Dec. 27, 1951

INVENTOR
W. R. YOUNG, JR.
BY B. F. Stoddard
ATTORNEY

United States Patent Office 2,745,953

Patented May 15, 1956

2,745,953

RADIANT ENERGY SIGNALING SYSTEMS

William R. Young, Jr., Summit, N. J., assignor to Bell Telephone Laboratories, Incorporated, New York, N. Y., a corporation of New York Application December 27, 1951, Serial No. 263,561

3 Claims. (Cl. 250—6)

This invention relates to radiant energy signaling systems and, more particularly, to radio telephone communication systems having a plurality of mobile radio telephone stations.

In the mobile radio telephone art, it is the practice for the mobile stations to be served by a base station which is fixedly located. Communication is effected by modulating carrier waves with intelligence signals; carrier waves having an assigned mean frequency being transmitted from the radio telephone base station to the mobile radio telephone stations, and carrier waves having a different mean frequency being transmitted from the mobile stations to the base station. These two assigned mean frequencies constitute one two-way radiant energy signaling channel. The service zone of the base station is, of course, limited to a certain geographical area the boundaries of which depend upon the power of the carrier waves and the nature of the terrain.

To provide radio telephone service for mobile stations moving in a different geographical area, a base station must be installed in this second area. Since the service zone of the second base station may overlap the service zone of the first base station, their carrier waves may produce interference within the region of the overlap. Such interference may be avoided to a certain extent by assigning to the second base station a different two-way radiant energy signaling channel having two frequency allocations which are different from those of the first-mentioned channel and by having the radio transmitting and receiving equipments in the mobile stations in this second service zone tuned to the two frequency allocations of this second channel. Similar two-frequency channels may be assigned for service in other geographic areas, the two frequency allocations of each of these additional channels being different from those of each of the other channels. If desired, the frequency allocations of these carrier channels may all lie within the same band in the frequency spectrum. The individual two-frequency channels may be closely separated from each other, such as by a frequency separation of about 50 kilocycles.

Although the allocation of different channels to the different service zones avoids certain types of interference which might occur in regions where the zones overlap, there are other types of interferences that may still occur. One such type of interference is that encountered when a mobile station belonging to one system moves to a location near the base transmitter of a second system. In this event, the mobile station is likely to be much closer to the second system's base transmitter than it is to the base transmitter of its own system with the result that carrier waves from the second system will be received at this mobile station with much greater intensity than carrier waves from the first system. These strong carrier waves may seize control of the limiter circuit in the mobile receiver and thereby virtually exclude signals from the base station of the first system since it is a characteristic function of a limiter to discriminate in favor of current of higher level thereby acting in effect as a selector of the wave having the greater amplitude. Thus, the carrier of the second system, in effect, captures the signaling channel assigned to the mobile receiver of the first system.

Another type of interference arises when a mobile station of one system moves near a base receiver of another system and then starts to transmit carrier waves. These carrier waves may, due to the proximity of the two equipments, arrive at the input circuit of the base receiver with such high intensity as to overcome the selectivity of this receiver.

Accordingly, it is an object of this invention to provide means for reducing interference in radio telephone communication systems wherein some of the stations are mobile.

An additional object of the invention is to provide means for preventing the capture of a signaling channel in a radio telephone system by an undesired carrier.

These and other objects of the invention are accomplished by means that are explained in detail hereinafter in connection with the following description of the drawing in which.

Figure 1:
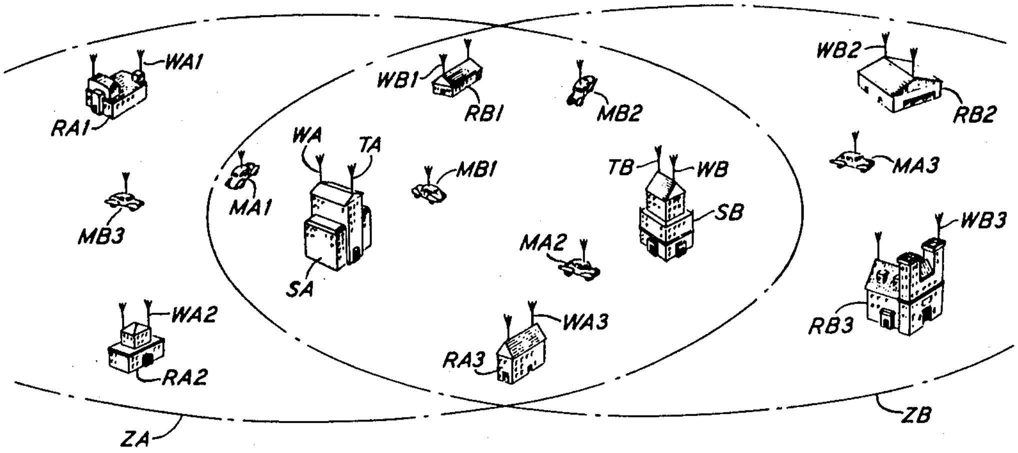
Fig. 1 is a pictorial representation of two radio telephone systems having overlapping service zones.

In Fig. 1, a radio telephone communication system A is shown to include a fixedly located base station SA equipped with a transmitting antenna TA for providing radio telephone communication service within a service zone indicated by the broken line ZA. A plurality of fixedy located receiving stations RA1, RA2, and RA3 are spaced apart from each other throughout the zone ZA. The system A also comprises a plurality of mobile radio telephone transmitting-receiving stations MA1, MA2, and MA3. A second radio telephone system B is also represented in Fig. 1. The system B is somewhat similar to the first system A but the transmitting antenna TB at its fixedly located base station SB has a different coverage area which is indicated by the broken line ZB. Disposed at various locations within the second service zone ZB are a plurality of fixedly located space-diversity receiving stations RB1, RB2, and RB3 which are associated with the base station SB. A second plurality of mobile radio telephone transmitting-receiving stations MB1, MB2, and MB3 are assigned to this second system B. The equipment elements in Fig. 1 that are designated by the "W" series of reference characters are described hereinafter in connction with the description of Fig. 2.

Each of the systems A and B may be similar to the system disclosed in an article by A. C. Peterson, Jr., entitled "Vehicle Radiotelephony Becomes a Bell System Practice" and published on pages 137 to 141, inclusive, of the "Bell Laboratories Record," April, 1947. It is to be understood that the fixedly located receiving stations RA1 to RB3, inclusive, may be connected to their respective base stations SA and SB by wire lines in the manner described in the Peterson article. Although the mobile stations MA1 to MB3, inclusive, are represented as being mounted on automobiles, it is to be understood that they may be carried on other types of vehicles, such as boats, trains, or airplanes.

As indicated in Fig. 1, the locations of the base stations SA and SB happen to be such that their respective service zones ZA and ZB overlap. In order to avoid some of the interference that might possibly occur in the region of the overlap, one two-frequency channel having mean carrier frequency allocations of F1 and F2 is assigned to system A and another two-frequency channel having mean carrier frequency allocations of F3 and F4 is assigned to system B. Thus, the base station SA transmits over the frequency F1 to its associated mobile stations MA1, MA2, and MA3, and they, in turn, transmit over the frequency F2 to their associated base receivers RA1, RA2, and RA3. Similarly, the base station SB transmits over the frequency F3 to its mobile stations MB1, MB2, and MB3 which transmit over the frequency F4 to the base receivers RB1, RB2, and RB3.

Since the stations MA1 to MB3, inclusive, are mobile, they can change their locations at will. From the standpoint of obtaining the optimum quality of radio telephone communication service, the mobile stations should confine their movements to the immediate vicinity of their respective base stations SA and SB. However, the mobile stations will, for various reasons, move to other locations and may move outside their assigned service zone into the service zone of the other system. For example, as is shown in Fig. 1, the mobile station MA3 is outside of its service zone ZA and is in the service zone ZB of system B. Similarly, the mobile station MB3 is beyond the limits of its service zone ZB and is in the zone ZA of system A. Even though the other mobile stations MA1, MA2, MB1, and MB2 are within their respective service zones, they are also within the service zone of the other system because they are in the region of the overlap. Thus, the two other types of interference mentioned above are liable to occur.

Figure 2:
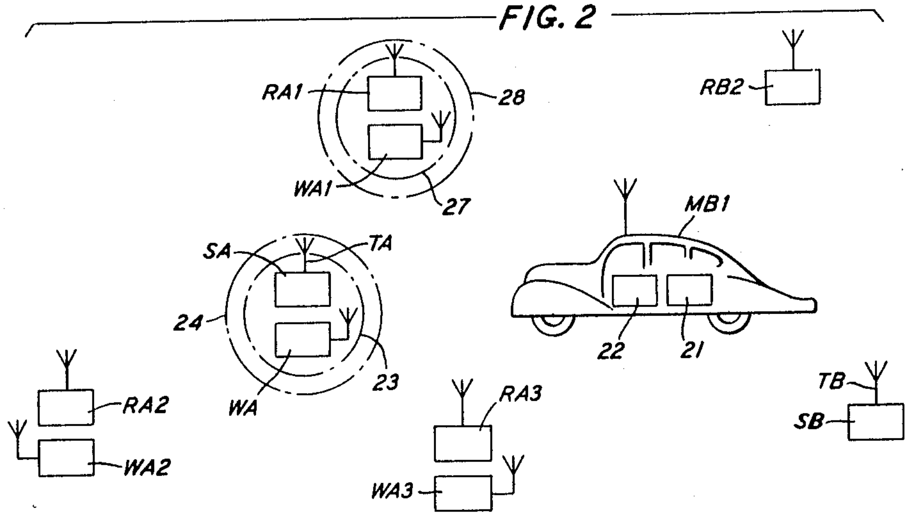
Fig. 2 is a schematic representation of a portion of the systems shown in Fig. 1.

The manner in which these last-mentioned types of interference may be avoided to a considerable extent will now be explained with reference to Fig. 2 which represents a portion of the systems illustrated in Fig. 1. Specifically, Fig. 2 shows the base station SB of system B, one of its fixedly located receiving stations RB2, and one of its mobile stations MB1. The mobile station MB1 is indicated as being provided with a radio receiver 21 tuned to receive carrier waves having a mean frequency value of F3 transmitted from its base station SB, and a radio transmitter 22 adapted to transmit carrier waves centering about the mean frequency F4 for reception by its associated fixed receiving station RB2. Fig. 2 also shows the base station SA of system A and its associated fixedly located receiving stations RA1, RA2, and RA3. As was stated above, the base station SA transmits over frequency F1 and the receiving stations RA1, RA2, and RA3 receive over frequency F2.

The first type of interference to be particularly avoided is that which is liable to occur when the mobile station MB1 is physically near the base station SA of system A and relatively far from its own base station SB. Although the power of the carrier radiated from the transmitting antenna TA at station SA is at a different frequency F1 than the frequency F3 to which the mobile radio receiver 21 is normally responsive, this carrier arrives with such high intensity that the receiver 21 will respond to it but with less than normal sensitivity. It may be stated here that the sensitivity of a radio receiver can be defined as being the relative fractional response or attenuation produced in the receiver between a desired carrier and an undesired carrier. In other words, the amount by which this response is less than normal is called the sensitivity factor of the receiver's selective circuits. Thus, whenever the mobile station MB1 moves into the vicinity of the base station SA, this area being indicated by the broken line 23 in Fig. 2, the signal from station SA will appear in the audio output circuit of the receiver 21.

If the customer at station MB1 responds to this signal from station SA by using his transmitter 22, considerable confusion will result. The fixed receivers RA1, RA2, and RA3 are tuned to the frequency F2 and will not respond to the frequency F4 of the customer's transmitter 22. This lack of an answer may cause the customer to think that his transmitter 22 is out of order. If his signals are received by one of the fixed receivers, such as the receiver RB2, of his own system B, there will still be confusion because he has not been called by his own base station SB. Furthermore, signals from his base station SB are now received in a weak condition due to his present location and cannot produce a response in his receiver 21 as it has been seized by the carrier from the base station SA. Consequently, the customer is liable to become dissatisfied and may wish to complain about the quality of the service.

Figures 3, 5:
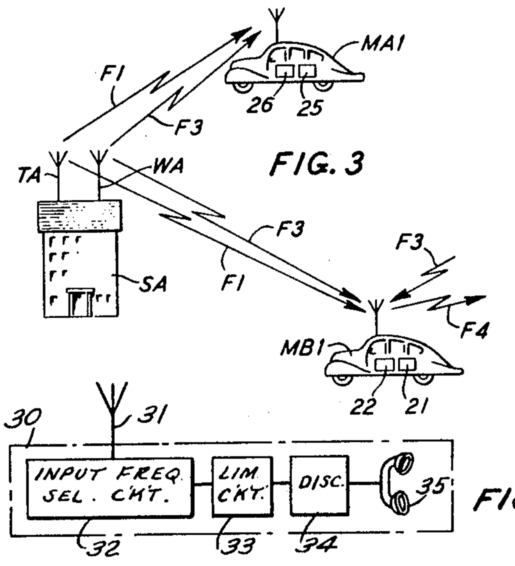
Fig. 3 is a diagrammatic representation of a portion of the systems shown in Fig. 2.
Fig. 5 is a diagrammatic representation of a typical radio receiving circuit used at any of the radio receiving stations shown in Fig. 1.

This confusion can be avoided by preventing the customer at the mobile station MB1 from using his equipment while his station is moving about within the area 23. To accomplish this, a warning transmitter WA is placed at the location of the base transmitter SA. The warning transmitter WA is designed to radiate power at the frequency F3 to which the receiver 21 is responsive. This is represented diagrammatically in Fig. 3 which shows the base station SA of system A with its transmitting antenna TA radiating carrier energy at the frequency F1 to the mobile station MB1. Fig. 3 also shows the warning transmitter WA located near the antenna TA and radiating carrier energy at the frequency F3 to the mobile station MB1. In the mobile radio telephone art, signals are usually transmitted by the frequency moduation method and, consequently, all of the radio receivers are provided with conventional limiter circuits as is indicated in Fig. 5 which is a simplified showing of a typical radio telephone receiving circuit used at any of the radio receiving stations. In Fig. 5 the reference character 30 denotes a conventional frequency modulation radio telephone receiving circuit comprising an antenna 31, an input frequency selective circuit 32, a limiter circuit 33, a discriminator 34, and a telephone handset 35. The operation of the receiving circuit of Fig. 5 is similar to that of the radio telephone receiving circuit shown in Fig. 3 in Patent 2,572,235, issued October 23, 1951, to W. R. Young, Jr., wherein it is stated that reception of the assigned carrier energy, even though it may be unmodulated, tends to saturate the limiter circuit in the receiver and thereby prevents its seizure by the undesired carrier energy.

The value of the power radiated by the warning transmitter WA is so chosen that its signal will be heard only within the area indicated by the broken line 24 in Fig. 2, the extent of this area being somewhat greater than the area 23. Thus, when the mobile station MB1 is within the area 24, the signal from the warning transmitter WA should be heard in preference to the signal from the transmitter SA. Since the frequency F3 of the warning transmitter WA is the frequency to which the mobile receiver 21 is tuned whereas the transmitter SA operates on the frequency F1 to which the receiver 21 has selectivity, the attenuation produced in the selective circuits of the receiver 21 weakens the interfering carrier F1 so that, when it enters the limiter stage, the warning carrier F3 will predominate to prevent seizure by the carrier F1. Thus, the transmitter WA may be considered as constituting masking means and as being a part of suppressing means for minimizing the above-mentioned seizure effect.

The carrier from the masking or warning transmitter WA will be heard predominately if its power is not less than the power of the base transmitter SA reduced by the amount of receiver selectivity. In other words, the power of the warning transmitter WA is less than the power of the base transmitter SA by an amount which when expressed in decibels is approximately equal to the value expressed in decibels of the sensitivity factor of the selective circuits in the mobile receiver 21. As was stated above, the value of the sensitivity factor of the receiver's selective circuits may be considered as expressing the relative attenuation performed by the circuits upon radiant energy received over both of the channels. For example, if the power of the base transmitter SA is 250 watts, and if the sensitivity factor of the mobile receiver 21 is 45 decibels, then the warning function of the transmitter WA could be accomplished with as little as 8 milliwatts of power. From a practical standpoint, it is advisable to increase this power by a selected number of decibels equivalent to a safety factor. Thus, in this example, it would be desirable to provide a safety factor of about 6 decibels in which case the appropriate power of the warning transmitter WA would be approximately 32 milliwatts.

As is indicated in Fig. 3, when a mobile station belonging to system A, such as the station MA1, is within the area 24 it will receive both its assigned carrier F1 and the warning carrier F3. Since the radio receiver 25 of the mobile station MA1 is tuned to receive the carrier F1 and since it has selectivity at the frequency F3 of the warning transmitter WA, no interference should be produced in the mobile receiver 25, especially since the receiver 25 will receive a much stronger signal from its base transmitter SA than from the warning transmitter WA.

The second type of interference to be particularly avoided is that which is liable to occur when a mobile station of one system, such as station MB1 of system B, transmits from a position near a fixedly located receiving station of the other system, such as the receiving station RA1 of system A. Thus, when the mobile station MB1 moves into the vicinity of the fixed receiving station RA1, this area being indicated by the broken line 27 in Fig. 2, and starts to operate its transmitter 22, its carrier F4 will appear with considerable strength at the input to the base receiver RA1. Although the receiver RA1 is tuned to respond to its assigned frequency F2 and therefore normally has selectivity against the operating frequency F4 of the mobile station MB1, this selectivity will be overcome due to the high intensity of the received carrier F4 and its signal will be heard in the receiver RA1. This signal may cause interference either by falsely signaling the base operator in the system A, or by causing crosstalk in system A if a call in that system is in progress.

Figure 4:
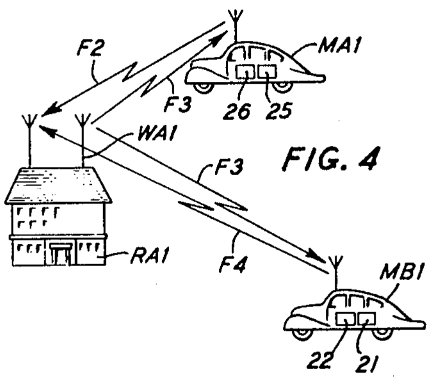
Fig. 4 is another diagrammatic representation of a different portion of the systems shown in Fig. 2.

This may be avoided by warning the customer at the mobile station MB1 not to operate his transmitter 22 while his station is in the vicinity of the fixed receiving station RA1. Since the customer is not always aware of his proximity to a fixed located receiving station of another system, some means must be provided for supplying this information to him. Such a means may be constituted by placing a warning transmitter WA1 at the location of the fixed receiver RA1 and by causing it to send out a signal on the frequency F3 to which the mobile radio receiver 21 is tuned. This is represented diagrammatically in Fig. 4 which shows the fixedly located receiving station RA1 of the system A with the warning transmitter WA1 at the same location. As is indicated in Fig. 4, the mobile station MB1 radiates its assigned carrier frequency F4 and is tuned to receive the warning carrier frequency F3. The warning transmitter WA1 is designed to radiate its signal with sufficient power to be heard within an area represented by the broken line 28 in Fig. 2. It is to be noted that the area 28 is slightly larger than the area 27.

Thus, when the mobile station MB1 moves into the warning area 28 and the customer picks up his telephone instrument in preparation for placing a call, he will hear the signal from the warning transmitter WA1 in his telephone receiver. In order for this signal to be readily recognized, the carrier F3 transmitted by the warning transmitter WA1 may be modulated with a distinctive tone. Upon hearing this tone, the customer will know that he is in an interference area and should not attempt to place a call at this time. Similarly, if his station MB1 should enter the warning area while the customer is already engaged with a call, the reception of the warning tone will serve to inform the customer that he should discontinue the call until his station MB1 moves out of the warning area.

The extent of the interference area 27 depends upon the value of the power radiated from the mobile transmitter 22, the sensitivity of the fixed receiver RA1 which in turn is determined in part by electrical background noise, the selectivity of the receiver RA1, and also the loss in the propagation path between the mobile transmitter 22 and the fixed receiver RA1. For example, let it be assumed that the sensitivity of the fixed receiver RA1 is such that a signal on its assigned carrier F2 may just be heard if its level upon entering the receiver is 140 decibels below one watt. Let it also be assumed that the selectivity of the receiver RA1 for energy having the frequency F4 is 40 decibels. Then the just-audible level for input energy at the frequency F4 will be 100 decibels below one watt. Consequently, if the power radiated by the mobile transmitter 22 is 25 watts, which equals 14 decibels above one watt, then the interfering signal will be just audible if the loss in the radiant energy path from the mobile station MB1 to the fixed receiver RA1 is 114 decibels. This determines the extent of the interference area because this loss is related to distance.

For any position of the mobile station MB1 where the above-mentioned loss is 114 decibels, the loss in the propagation path in the opposite direction, that is from the warning transmitter WA1 to the mobile receiver 21, will also be 114 decibels on the average. Since the warning transmitter WA1 radiates power on the frequency F4 to which the mobile receiver 21 is most sensitive, the warning signal will be heard at the mobile station MB1 provided its level at the input to the mobile receiver 21 is 140 decibels below one watt and provided the transmitter at the base station SB is idle at this time. The value of the power required to be radiated by the warning transmitter WA1 to produce this effect will then be the just-audible power of 140 decibels below one watt increased by the attenuation of the propagation path which is 114 decibels thereby resulting in a power value of 26 decibels below one watt. This represents about 2.5 milliwatts of power. Thus the power of the warning transmitter WA1 should be equal to the power of the mobile transmitter 22 reduced by an amount which when expressed in decibels is approximately equal to the value expressed in decibels of the sensitivity factor of the selective circuits in the fixedly located receiver RA1. In order for the warning area 28 to be somewhat larger than the interference area 27, it is desirable to increase the value of the power radiated by the warning transmitter WA1 to about 10 milliwatts.

It should be noted that, if the just-audible assigned carrier energies for the fixed receiver RA1 and the mobile receiver 21 were equal but were different than assumed above, this would change both the interference area 27 and the warning area 28 by the same relative amount but would not require readjustment of the power of the warning transmitter WA1. It was assumed above that the just-audible assigned signal was of the same level for both the fixed receiver RA1 and the mobile receiver 21, and this is likely to be true in general. However, if there is a disparity in the just-audible levels, this can be compensated for by appropriately readjusting the power of the warning transmitter WA1.

When a mobile station belonging to the system A, such as the station MA1, is within the warning area 28, as is represented in Fig. 4, the customer at that station may wish to operate his radio transmitter 26 for transmitting his assigned carrier F2 to the fixed receiver RA1. Since the station MA1 is now assumed to be within the transmitting range of the warning transmitter WA1, the warning carrier F3 will be received at station MA1. However, the power of the warning carrier F3 is relatively weak, as was stated above. Due to the radio receiver 25 at the mobile station MA1 having selectivity at the frequency F3, no interference should be produced therein by the warning signal and, in fact, it should not be heard by the customer at station MA1.

As any of the mobile units of system B may move into the vicinity of any of the fixedly located receiving units of the system A, similar warning transmitters WA2 and WA3 should be placed at the locations of the other fixed receivers RA2 and RA3, respectively, as is indicated in Figs. 1 and 2.

This method of avoiding these two particular types of interference has been described above from the standpoint of possible interference between the fixedly located units of one system and the mobile units of a second system. It is to be understood that these two types of interference may also be produced by the movement of any of the mobile units of the first system A into the vicinity of any of the fixedly located units of the second system B. Such interference can be avoided by placing similar warning transmitters WB, WB1, WB2, and WB3 at the respective locations of the fixed units RB, RB1, RB2, and RB3 as is indicated in Fig. 1. This method may be applied in a similar manner to any number of systems which are operating in the same or nearby areas by placing a low-powered warning transmitter near each fixedly located transmitter and receiver. It may also be applied to a multichannel system and, from this standpoint, Fig. 1 may be considered as representing a single system for providing communication service over a plurality of signaling channels.

The particular embodiment of the invention that has been described above has been presented for the purpose of explaining the principles and features of operation of the invention. It is to be understood that the invention is not limited to this specific embodiment as various modifications may be made without exceeding the scope of the invention which is to be limited only by the claims appended hereto.

What is claimed is:

1. A multichannel frequency modulation radio communication system comprising in combination, a first fixedly located radio transmitter operating on a carrier frequency F1, a second radio transmitter fixedly positioned at a location different from that of said first transmitter and operating on a carrier frequency F3 closely spaced in the frequency spectrum to F1, a mobile radio station including a radio receiver having frequency selective circuits tuned to provide a maximum response when energy of said first carrier frequency F1 is received by said receiver and an attenuated response when energy of said second carrier frequency F3 is received by said receiver, said attenuated response having a value which when expressed in decibels is N decibels lower than said maximum response when said receiver is subject to equal field strengths at said carrier frequencies F1 and F3, said mobile radio receiver also having a limiter circuit designed to discriminate in favor of the current of higher level between two simultaneously applied currents of different frequencies, warning means for warning an operator at said mobile station that the operation of his station should be discontinued when his station has moved away from said first transmitter and into an interference area constituted by the immediate vicinity of said second transmitter, said warning means including a third radio transmitter fixedly positioned at the same location as said second transmitter and operating continuously on said carrier frequency F1, the power of said third transmitter being equal to $P+(S-N)$ wherein P is the value of the power of the carrier waves radiated by said second transmitter and S is the power equivalent of the value expressed in decibels of an arbitrary safety factor which is smaller than the value of N so that the expression $(S-N)$ represents a negative quantity whereby energy from said warning transmitter dominates the limiter circuit of said mobile receiver only when said mobile station is in said interference area.

2. A multichannel frequency modulation radio communication system comprising in combination, a first mobile radio communication station having a first radio transmitter operating on a carrier frequency F2, a first fixedly located radio communication station having a second radio transmitter operating on a carrier frequency F3 closely spaced in the frequency spectrum to F2, a second mobile radio communication station including a third radio transmitter operating on a carrier frequency F4 and a first radio receiver having frequency selective circuits tuned to provide a maximum response only when energy of said carrier frequency F3 is received, a second fixedly located radio communication station positioned at a location different from said first fixed station and including a second radio receiver having frequency selective circuits tuned to provide a maximum response when energy of said carrier frequency F2 is received from said first transmitter at said first mobile station and an attenuated response when energy of said carrier frequency F4 is received from said third transmitter at said second mobile station, said attentuated response having a value which when expressed in decibels is N decibels lower than said maximum response when said receiver is subject to equal field strengths at said carrier frequencies F2 and F4, said second receiver at said second fixed station being subject to interference produced by carrier energy from said third radio transmitter at said second mobile station when said second mobile station moves into an interference area constituted by the immediate vicinity of said second fixed station, warning means for warning an operator at said second mobile station that the operation of his station should be discontinued when his station has moved into said interference area, said warning means including a fourth radio transmitter fixedly located at said second fixed station and operating continuously to transmit a distinctive tone modulated on said carrier frequency F3, the power of said fourth transmitter being equal to $$P+(S-N)$$

wherein P is the value of the power of the carrier waves radiated by said third transmitter from said second mobile station and S is the power equivalent of the value expressed in decibels of an arbitrary safety factor which is smaller than the value of N so that the expression $(S-N)$ represents a negative quantity whereby said tone-moduated carrier can be heard in said first radio receiver at said second mobile station only when said second mobile station is in said interference area.

3. In combination, a first mobile two-way radio communication system comprising a first fixedly located transmitter operating to transmit frequency modulation signals at a carrier frequency F1, a first radio receiver fixedly positioned at a location different from that of said first transmitter being selectively responsive to frequency modulation signals of carrier frequency F2 and giving an attenuated response at a frequency F4 near F2 in the frequency spectrum, a first mobile station for communicating with said first transmitter and receiver comprising a second radio transmitter for transmitting frequency modulation signals on the carrier frequency F2 and a second radio receiver selectively responsive to frequency modulation signals of carrier frequency F1 and giving an attenuated response at a frequency F3 near F1 in the frequency spectrum, a second mobile two-way radio communication system comprising a third radio transmitter fixedly located and operating to transmit frequency modulation signals on the carrier frequency F3 near F1 in the frequency spectrum, a third radio receiver fixedly located and selectively responsive to frequency modulation signals of carrier frequency F4 and giving an attenuated response at the frequency F2, said third transmitter and receiver being fixedly positioned at locations that are different from each other and also different from the locations at which said first transmitter and receiver are positioned, a second mobile station for communicating with said third transmitter and receiver comprising a fourth radio transmitter for transmitting fequency modulation signals on the carrier frequency F4 and a fourth radio receiver selectively responsive to frequency modulation signals of carrier frequency F3 and giving an attenuated response at the frequency F1, and a warning system for reducing interference between said first and second mobile two-way radio systems comprising in said first radio system a first warning radio transmitter fixedly located adjacent said first transmitter and operating to transmit tone modulated carrier of the frequency F3 at reduced strength with respect to the carrier F1 transmitted by said first transmitter, and a second warning radio transmitter fixedly located adjacent said first receiver and operating to transmit tone modulated carrier of the frequency F3 at reduced strength with respect to the carrier F4 transmitted by said fourth radio transmitter, said warning system comprising in said second radio system a third warning transmitter located adjacent said third transmitter and operating to transmit tone modulated carrier of the frequency F1 at reduced strength with respect to the carrier F3 transmitted by said third transmitter, and a fourth warning transmitter located adjacent said second fixed receiver and operating to transmit tone modulated carrier of the frequency F1 at reduced strength with respect to the carrier F2 transmitted by said second transmitter.

References Cited in the file of this patent

UNITED STATES PATENTS

| | | |
|---|---|---|
| 2,476,337 | Varian | July 19, 1949 |
| 2,530,142 | Atkins | Nov. 14, 1950 |
| 2,545,511 | Brinkley | Mar. 20, 1951 |

OTHER REFERENCES

AIEE publication, Radio Dispatching System, For Large Taxicab Fleet Operation, December 12, 1951.